Oct. 29, 1940.　　　　E. HAMEL　　　　2,219,840
SPINDLE BEARING
Filed May 4, 1938
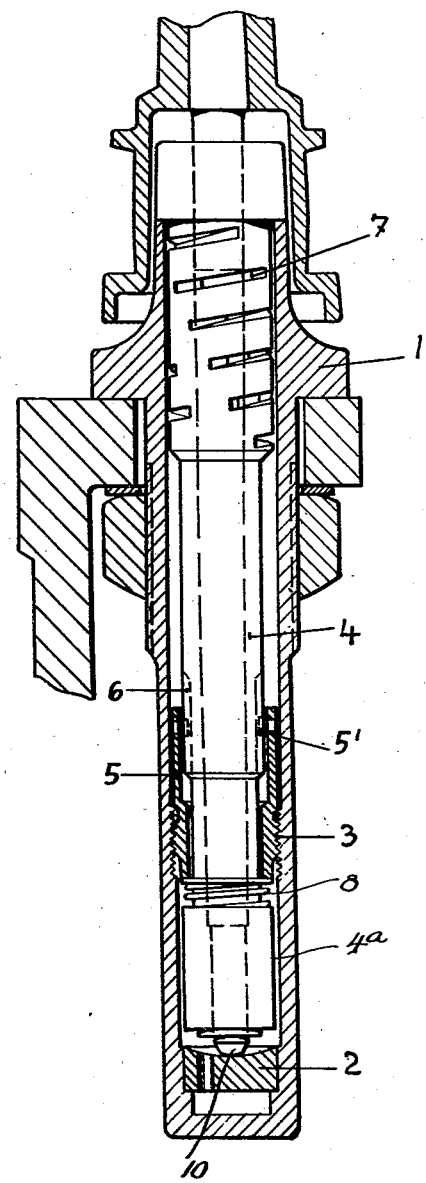
Inventor:
E. Hamel
By: Glascock Downing & Seebold
Attorneys.

Patented Oct. 29, 1940

2,219,840

UNITED STATES PATENT OFFICE 2,219,840

SPINDLE BEARING

Edmund Hamel, Siegmar-Schonau, near Chemnitz, Germany

Application May 4, 1938, Serial No. 206,075
In Germany August 3, 1937

2 Claims. (Cl. 308—169)

This invention relates to spindle bearings in spinning and twisting machines.

It is frequently necessary to remove the rapidly moving spindles of spinning and twisting machines from their bearings. To facilitate this operation the spindles are arranged in guides and can be taken out together with their guides which are each inserted in a bush shutting off the entire bearing from the outside. The guide or guide sleeve is inserted with its top portion receiving the collar bearing in a bore of corresponding width in the bush and locked in this position. For technical reasons, the arrangement must be such that the guide sleeve can be readily removed. The frictional effects concerned during vibration due to operation are not of the sliding kind but take the form of rapidly succeeding blows which do much damage when frequently repeated.

The greater the possibility of lateral deflection of the lower part of the guide sleeve the stronger will be the blowlike effects in the upper portion where the sleeve is inserted in the bush. On the other hand, the better the provisions for keeping the point of the spindle centered during operating vibrations the greater the damping of the blows.

The invention aims therefore at providing for the guide sleeve directly surrounding the spindle suitable means to center the point of the spindle relative to its bearing which is formed so as to facilitate placing the point in proper central position. In this way, the vibrations due to operation and injuriously affecting the point where the guide is inserted in the bush are effectively damped.

Unavoidable frictional effects are minimized by insuring good lubrication at the points exposed to greatest danger. For this purpose, some clearance is left between the guide and inner wall of the bush and slots are provided in the guide which permit free access to the inside of the guide filled with a lubricant. Owing to the rotation of the spindle the lubricant is kept in continual motion and forced outside through the slots to cover the surfaces of the endangered bearing parts, viz. the outer surface of the guide and the inner surface of the bush, with a protective oil film.

The openings in the guide are preferably arranged diagonally to the axial direction of the spindle and comprise a plurality of superposed longitudinal slots separated by webs and disposed in a helical line over the surface portions of the guide where frictional effects during operation are to be expected. To keep the point of the spindle always in central position and thus dampen the frictional effects the point extends downwardly into a step bearing and the guide is constantly pressed in the direction of the step bearing by a tensioned spring.

The guide with its fixing means is inserted as a self-contained unit in the bush, and during insertion and subsequent screwing on of the guide proper positioning is simultaneously effected by the compression of a spring. The spring acts at one end against a stop at the lower end of the guide and with the other end against a sleeve axially guided on or in the guide by slot and key and possessing external thread so that it can be screwed in the bush. At the point where the top of the spindle is disposed the step bearing is concave, so that the point of the spindle is automatically centrically guided owing to the axial sliding effect of the guide and the concave surface of the step bearing.

By way of example, the invention is illustrated in the accompanying drawing which shows a longitudinal section of the device.

The bush 1 receives in its lower portion the step bearing 2 having a concave bearing surface for centering the lower end of the spindle 10. The bush 1 has a threaded portion 3 and receives the guide 4, the middle portion of which is guided in an externally threaded sleeve 5 which can be screwed in at 3 and preferably possesses a nose 5' for engaging a longitudinal slot 6 of the guide 4.

The upper portion of the guide 4 is fitted with diagonal slots 7 extending completely through the guide from the bore to the exterior thereof. In the embodiment shown the slots 7 are staggered relative to one another but may be arranged also symmetrically above one another.

A tensioning spring 8 is interposed between the threaded sleeve 5 and the lower terminal portion 4ª of the spindle guide 4. The tension exerted by the spring 8 may be varied by turning the sleeve 5 within the threaded portion of the bush 1, such movement of the threaded sleeve 5 being conveniently effected by turning the guide 4, the movement of the latter being imparted to this sleeve by the pin and slot connection 5'—6.

In operation, the lubricant is kept in continual motion by the rotary movement of the spindle and is forced through the slots 7 and maintains a protective film of lubricant between the outer surface of the guide 4 and the inner surface of the bush 1.

I claim:

1. A spindle bearing for spinning and twisting machines, comprising a guide directly surrounding the spindle and having an upper portion diagonally slotted relative to the axis of the spindle and filled with a lubricant for the passage of lubricant from the interior to the exterior of the guide, an internally threaded bush into which the guide is inserted and fitted at its upper portion and a step bearing having a concave bearing surface for the reception of the spindle point.

2. A spindle bearing according to claim 1, in which a displaceable externally threaded sleeve surrounding the lower portion of the guide is connected therewith by slot and key and permits only axial displacement and a compression spring abutting against a shoulder of the lower portion of the guide tensioned by screwing said sleeve into the internally threaded bush by turning the guide.

EDMUND HAMEL.